United States Patent [19]

Harrington et al.

[11] Patent Number: 4,939,644
[45] Date of Patent: * Jul. 3, 1990

[54] INPUT/OUTPUT CONTROLLER FOR CONTROLLING THE SEQUENCING OF THE EXECUTION OF INPUT/OUTPUT COMMANDS IN A DATA PROCESSING SYSTEM

[75] Inventors: David M. Harrington, Upton; Steve A. Caldara, Wayland; Louis A. Lemone, Stow; Kenneth R. Andrews, Jr., Northboro, all of Mass.

[73] Assignee: Data General Corporation, Westboro, Mass.

[*] Notice: The portion of the term of this patent subsequent to Feb. 13, 2007 has been disclaimed.

[21] Appl. No.: 4,757

[22] Filed: Jan. 9, 1987

Related U.S. Application Data

[63] Continuation of Ser. No. 496,173, May 19, 1983, abandoned.

[51] Int. Cl.⁵ .......................... G06F 9/28; G06F 9/30
[52] U.S. Cl. ................... 364/200; 364/238.3; 364/239.4; 364/261.2; 364/261
[58] Field of Search ... 364/200 MS File, 900 MS File

[56] References Cited

U.S. PATENT DOCUMENTS

| | | | |
|---|---|---|---|
| 3,728,693 | 4/1973 | Macker et al. | 364/200 |
| 4,006,466 | 2/1977 | Patterson et al. | 364/200 |
| 4,075,691 | 2/1978 | Davis et al. | 364/200 |
| 4,156,932 | 5/1979 | Robinson et al. | 364/200 |
| 4,384,324 | 5/1983 | Kim et al. | 364/200 |
| 4,417,304 | 11/1983 | Dinwiddie, Jr. | 364/200 |
| 4,426,679 | 1/1984 | Yu et al. | 364/200 |
| 4,435,752 | 3/1984 | Winkelman | 364/200 |
| 4,451,884 | 5/1984 | Heath et al. | 364/200 |
| 4,488,258 | 12/1984 | Struger et al. | 364/900 |
| 4,543,626 | 9/1985 | Bean et al. | 364/200 |
| 4,583,165 | 4/1986 | Rosenfeld | 364/200 |
| 4,783,739 | 11/1988 | Calder | 364/200 |

Primary Examiner—Thomas C. Lee
Attorney, Agent, or Firm—Robert F. O'Connell

[57] ABSTRACT

A data processing system which includes a host processor and an input/output (I/O) controller unit for controlling communication with I/O devices. The I/O controller unit responds to a plurality of I/O commands from the host processor each of which is associated with one of a plurality of control block lists each containing one or more control commands. The I/O controller unit can access and store control commands from each of the plurality of control block lists and execute the stored commands from such lists in a selected order for providing the most effective execution thereof.

5 Claims, 5 Drawing Sheets

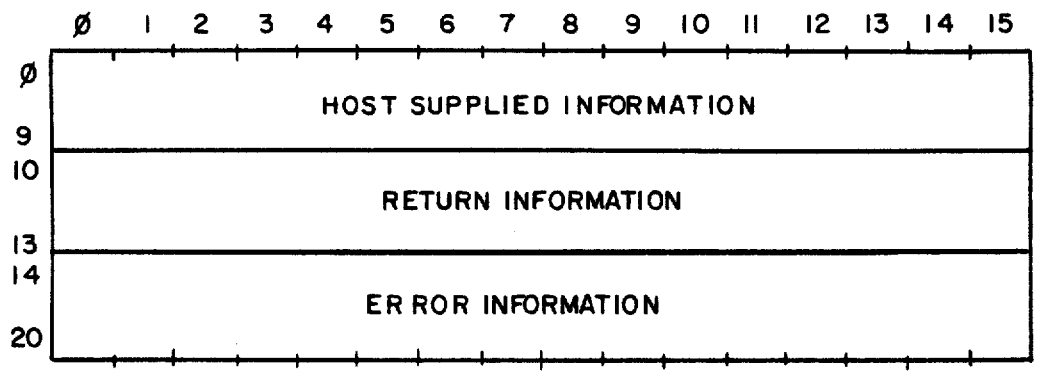
FIG. 2 CONTROL BLOCK
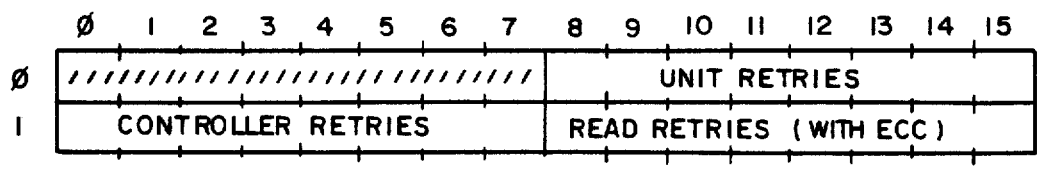
FIG. 4 CONTROLLER INFORMATION BLOCK
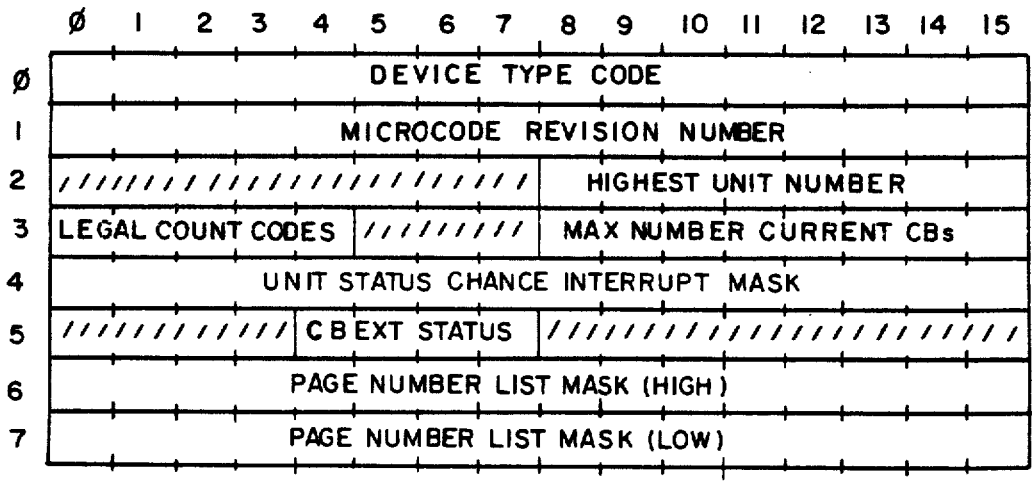
FIG. 5 INTERFACE INFORMATION BLOCK

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | LINK ADDRESS (HIGH) ||||||||||||||||
| 1 | LINK ADDRESS (LOW) ||||||||||||||||
| 2 | I | N | ///////// ||||| OPERATION CODE |||||||||
| 3 | PAGE NUMBER LIST ADDRESS (HIGH) ||||||||||||||||
| 4 | PAGE NUMBER LIST ADDRESS (LOW) ||||||||||||||||
| 5 | M | TRANSFER ADDRESS (HIGH) |||||||||||||||
| 6 | TRANSFER ADDRESS (LOW) ||||||||||||||||
| 7 | DEVICE ADDRESS (HIGH) ||||||||||||||||
| 8 | DEVICE ADDRESS (LOW) ||||||||||||||||
| 9 | //////////////////// ||||||||||| UNIT NUMBER |||||
| 10 | SPECIFY RETURN TRANSFER COUNT ||||||||||||||||
| 11 | CB STATUS ||||||||||||||||
| 12 | RESERVED ||||||||||||||||
| 13 | RESERVED ||||||||||||||||
| 14 | ERROR STATUS ||||||||||||||||
| 15 | UNIT STATUS ||||||||||||||||
| 16 | RETRIES PERFORMED ||||||||||||||||
| 17 | SOFT RETURN TRANSFER COUNT ||||||||||||||||
| 18 | PHYSICAL CYLINDER ||||||||||||||||
| 19 | PHYSICAL HEAD |||||||| PHYSICAL SECTOR ||||||||
| 20 | DISK ERROR CODE |||||||| //////////////////// ||||||||

FIG.3 CONTROL BLOCK

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | O | S | M | A | //////////// | | | | | UNIT NUMBER | | | | | | |
| 1 | DISK CONFIGURATION | | | | | | | | | | | | | | | |
| 2 | NUMBER OF LOGICAL BLOCKS (HIGH) | | | | | | | | | | | | | | | |
| 3 | NUMBER OF LOGICAL BLOCKS (LOW) | | | | | | | | | | | | | | | |
| 4 | NUMBER OF DATA BYTES/SECTOR | | | | | | | | | | | | | | | |
| 5 | NUMBER OF CYLINDERS | | | | | | | | | | | | | | | |
| 6 | NUMBER OF HEADS | | | | | | | | NUMBER OF SECTORS / TRACK | | | | | | | |

FIG.6   UNIT INFORMATION BLOCK

|   | 0 – 15 |
|---|---|
| 0–1 | ENDING MEMORY ADDRESS |
| 2–18 | CONTROLLER ERROR REPORT |
| 19–23 | UNUSED |
| 24–29 | DRIVE ERROR REPORT |
| 30–31 | UNUSED |

FIG.7   EXTENDED STATUS INFORMATION BLOCK

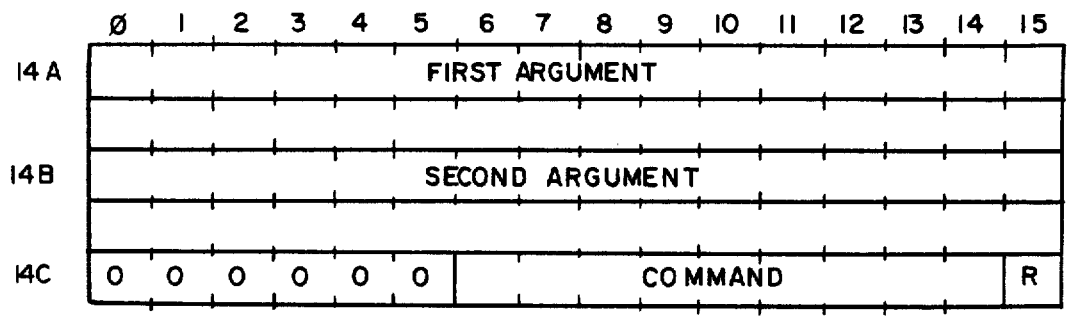
FIG. 8  COMMAND REGISTERS
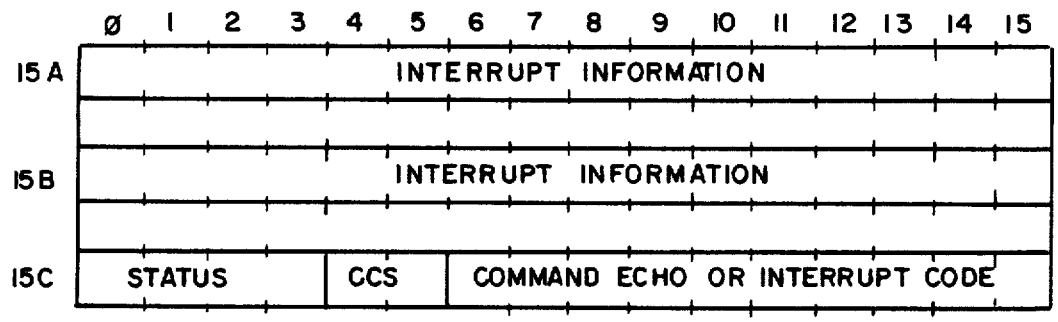
FIG. 9  STATUS REGISTERS

INPUT/OUTPUT CONTROLLER FOR CONTROLLING THE SEQUENCING OF THE EXECUTION OF INPUT/OUTPUT COMMANDS IN A DATA PROCESSING SYSTEM

This is a continuation of co-pending application Ser. No. 496,173 filed on May 19, 1983, now abandoned.

This invention relates generally to data processing systems and, more particularly, to a unique interface control system for providing communication between a host computer processor and an input/output control processor which in turn is in communication with external or peripheral devices.

BACKGROUND OF THE INVENTION

In order to provide communication between a host computer and a plurality of external input/output (I/O) units, or devices, such as disks, tapes, printers, display devices, etc., it is effective for data processing systems to utilize an intermediate control processor which communicates with the host computer processor and in turn communicates with a large number of I/O devices. Control of which devices require the transfer of data to and from the host computer then resides in the intermediate I/O controller.

In most conventional systems utilizing such approach the host processor supplies an appropriate command to an I/O controller processor which in turn interprets such commands so that the I/O device required can be identified and the appropriate data processing and transfer operation can occur. The host normally supplies such commands in sequence and the I/O processor processes such commands in such sequence. If the I/O processor is busy with a particular command requiring the servicing of a specified I/O device the host must wait until that process has been completed before it can issue subsequent commands related either to the same or to a different I/O device. Such an approach normally requires the transfer of a relatively large number of commands from the host processor and does not permit the controller to make the most effective use of a sequence of such commands. For example, if the host processor desires to access blocks of data from, or to store blocks of data on, an I/O device such as a disk, for example, such data blocks may reside at various locations on the disk and the Read/Write head which accesses the device must move from one location to the other in accordance with the particular command received by the I/O controller. Since in many cases the sequence of movements of the head on a particular disk required for a specific sequence of commands may not represent the most efficient movement for transferring all of the data required by such sequence, it is desirable to establish a more effective manner for controlling the data transfer to or from the same I/O device in an optimized fashion.

It is further desirable to arrange for the I/O controller to operate in response to a reduced number of commands from the host processor so that the host processor can transfer the desired information with the least amount of host processor time and with reduced I/O communication overhead so that the host processor can perform other tasks in the meanwhile.

BRIEF SUMMARY OF THE INVENTION

The system in accordance with the invention utilizes an I/O controller which is capable of receiving a single command from the host processor, which command can then be utilized to generate in turn an entire block or list of sequential commands which are pre-stored in the host's main memory, such memory thereby being effectively shared by both the host processor and the I/O controller. The host then need only supply a single host programmed I/O command to generate a relatively large number of sequential controller I/O commands associated therewith in order to perform any particular overall data transfer, rather than having the host processor supply an entire sequence of such commands for that particular data transfer operation.

Further, the I/O controller is arranged in accordance with the invention so that it can respond to several successive host processor programmed I/O commands and in turn generate several corresponding blocks or lists of command sequences, appropriate commands of each sequence being stored in the I/O controller local memory at any one time for suitable execution. The I/O controller can then execute such command lists in accordance with a suitably selected procedure as desired. Thus, the I/O controller may be controlled to provide a selected sequence of command list execution in which a complete command list is executed before a next successive complete command list is executed. Alternatively, an I/O controller may be arranged to select a more efficient procedure in which commands from several different command lists can be executed in any desired optimized order, i.e., an order in which commands can be selected from any of the command lists so that data transfers to and from the same I/O device can be most efficiently executed. Alternatively, either of such procedures may further be arranged to take into account appropriate priorities which may be established for such command lists by the host processor, for example, and perform such command lists in accordance with the established priorities.

Further, the I/O controller can be arranged to permit the host processor to utilize initialization commands independently of the programmed I/O commands, so as to cause the controller to operate in a selected one of a number of different ways as desired by the user, for example, with respect to the treatment of errors, the selection of the type of status information required by the host processor, the selection of which process to use when transferring information to or from a particular I/O device in accordance with a sequence of commands, and the like.

DESCRIPTION OF THE INVENTION

The invention can be described in more detail with the help of the accompanying drawings wherein FIG. 1 shows a block diagram of a system in accordance with the invention;

FIG. 2 shows a general data format of the contents of an exemplary control block of data used in the system of FIG. 1;

FIG. 3 shows a more specific data format of the control block of FIG. 2;

FIG. 4 shows a data format of the contents of a controller information block of data used by an I/O controller in the system of FIG. 1;

FIG. 5 shows a data format of the contents of an interface information block of data used by the I/O controller of FIG. 1;

FIG. 6 shows a data format of the contents of a unit information block of data used by the I/O controller of FIG. 1;

FIG. 7 shows a data format of the contents of an extended status information block of data used in the system of FIG. 1;

FIG. 8 shows the data contents used in the command I/O registers of FIG. 1; and

FIG. 9 shows the data contents used in the status I/O registers of FIG. 1.

Figure 1:
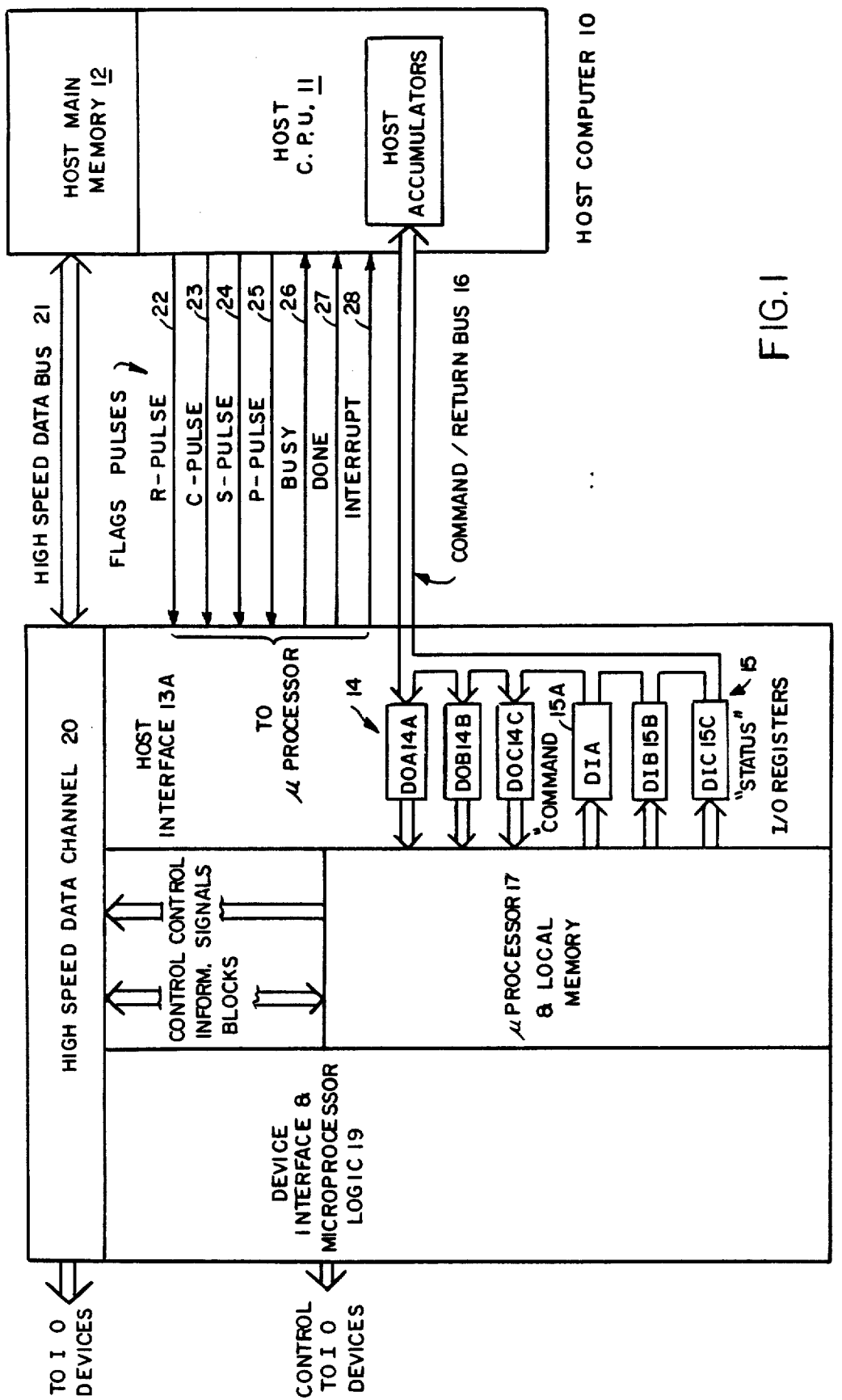

As can be seen in FIG. 1, a host computer 10 which includes a host central processor unit (CPU) 11 and a host main memory unit 12 requires communication with external I/O devices via an intermediate I/O controller unit 13 via appropriate buses as described in more detail below.

The I/O controller unit 13 utilizes appropriate host interface units 13A which include a plurality of input and output I/O registers identified as "command" registers 14 and "status" registers 15. In a particular embodiment, for example, command registers 14 which receive command signals from host processor 11 over a command/return bus 16 may comprise three such registers 14A, 14B and 14C, identified as registers DOA, DOB, and DOC. Return status information is then supplied in such particular embodiment on the command/return bus 16 to the host from status registers 15A, 15B and 15C, identified as registers DIA, DIB and DIC, respectively. As discussed in more detail below, incoming commands at registers 14 are appropriately processed by controller microprocessor 17 to obtain one or more control blocks of command information stored in the host main memory. A control block specifies, inter alia, the command operation to be executed and the location in main memory and at the external device with respect to which a data transfer is to take place. Controller 13 then communicates to one of a plurality of external I/O devices via suitable device interface and micro-processor logic 19 in response to such commands. In the particular system disclosed, transfers of data between the I/O devices and the host main memory are performed via a high speed data transfer channel 20, utilizing appropriate control signals from the micro-processor 17, via high speed data channel bus 21. Transfers of control block information and initiation information between the controller 13 and host main memory 12 also occurs via high speed data channel 20.

In addition to various host programmed I/O commands and controller return information which are transferred on bi-directional bus 16, further control signals can be transferred between the host processor and the I/O controller processor via dedicated lines 22-28 as described in more detail below.

Before discussing the control signals which are utilized by the I/O controller/host interface 13A it is desirable to discuss generally the advantages of utilizing the configuration of the invention as generally disclosed in the embodiment of FIG. 1.

The I/O controller 13 is provided with access to the host main memory by the micro-processor 17 via the high speed channel 20. When a command is received from the host CPU 11 and is placed in the command registers 14, such command can be appropriately interpreted by micro-processor 17 as requiring a sequence of one or more commands each command being part of a control block of information required to execute such command, i.e., an operation with respect to a selected external I/O device. Such sequence of control blocks can be pre-stored in the host main memory 12 so that when the micro-processor of the I/O controller 13 interprets a programmed I/O command from the host CPU 11, the controller successively accesses the entire sequence of control blocks from the host memory 12, fetching each block from main memory for storage in the I/O controller local memory 18 for execution before fetching the next control block of the sequence for each successive execution thereof. The controller is also arranged so that, during the execution of a command in one sequence, it can respond to another subsequent programmed I/O command from the host CPU for accessing a second sequence of control blocks, each one of which can be successively fetched for storage in local memory 18. In this way a plurality of input programmed I/O commands from the host CPU 11 can be used to generate a plurality of associated control block sequences, or lists, the control blocks of which can also be successively stored in local memory 18.

Thus, the local memory may have stored therein a large number of separate control blocks, one from each of a plurality of separate control block lists, any one of which can be selected in accordance with a predetermined algorithm, for example, to be executed at any one time. The total number of commands required to be issued by the host CPU is considerably reduced and the latter can be utilized for performing other operations which it normally could not perform in a conventional I/O interface system since the host would have to use that time to issue separately each one of the large number of commands for each such command sequence in previously known systems.

For example, in some cases where more than one of the control block (command) sequences (lists) concern themselves with the transfer of information to or from the same specified I/O device, it may be desirable to assure that such data transfers occur in the most efficient manner. In such a case it may be desirable for the micro processor 17 to utilize a predetermined algorithm for executing the commands from all of the lists involved which provides for the most effective, or optimized, movement of the I/O device access mechanism (e.g., a Read/Write head) with respect to the I/O device (e.g., a disk).

Alternatively, the I/O processor may be required by the host processor to execute the commands in an established sequence in accordance with an established priority of operation thereof. In any event, the execution of the commands provides for a transfer of information via the high speed data channel 20 to the host memory 12 where it can be appropriately utilized by the host CPU for whatever operation it desired to perform. Once a complete sequence of commands from any control block list has been performed, the registers 15 provide return information to the host CPU notifying the latter that such sequence has been completed and providing suitable status information concerning the state of the I/O controller 13.

Because the I/O controller shares memory space in main memory 12 with the host processor, such operation reduces the number of commands required from the host CPU when dealing with I/O devices and permits the most efficient execution of commands vis-a-vis such devices so that the overall control and data transfer operation can be optimized with respect to several programmed I/O commands from the host processor.

In order to better understand such operation, the format of a control block, which format is established for all control blocks, is shown in FIGS. 2 and 3. As seen in FIG. 2, in a particular embodiment thereof, the control block comprises twenty words of 16 bits each, a first selected group of words including information placed therein by the host computer, a second selected group of status return words supplied in a shared manner by the I/O controller and the host processor, and a third group of status error words supplied by the I/O controller. Such word groups are shown more specifically in FIG. 3.

As can be seen in FIG. 3, the host provides in words 0 and 1 a linking address (comprising a high, or most significant, portion and a low, or least significant, portion) which represents the address of the next successive control block of a sequence, or list, thereof. An address of zero indicates that the particular control block in question is the last one of a sequence. Thus, the I/O controller processor can always identify the location of the next control block of the sequence which must be fetched.

Word 2 includes an optional interrupt (I) bit (bit 0) which, when set by the host processor generates an unconditional interrupt of the host by the controller when each control block command has been completed. If not set, the controller generates an interrupt only when a complete list or sequence of control block commands has been completed (i.e., the link address is zero) or if an error occurs.

Word 2 also includes a "No Retries" bit N (bit 1) which, when set by the host processor, prevents any retry for any kind of error (hard or soft) so that, in effect, the controller treats all errors as hard errors. If N is not set, the errors are treated in accordance with the controller information block discussed below.

Bits 6–15 of word 2 contain the operation code which identifies the operation to be performed in accordance with the following octal coding, for example:

| Octal Code | Meaning |
| --- | --- |
| 000 | No Operation |
| 100 | Write |
| 101 | Write/Verify |
| 104 | Write Single Word |
| 105 | Write/Verify Single Word |
| 142 | Write with Modified Bit Map |
| 200 | Read |
| 201 | Read/Verify |
| 205 | Read/Verify Single Word |
| 210 | Read Raw Data |
| 220 | Read Headers |
| 242 | Read with Modified Bit Map |
| 400 | Recalibrate Disk |

Words 3–6 provide main memory address (or pointers thereto) via the host memory page listings and the starting address on such page at which the data transfer will commence in main memory. Bit 0 (M) of word 5, when set, indicates that the address is a logical address which requires a mapping into a physical memory. If not set, the address supplied by the host is a physical address.

Words 7 and 8 identify the address on the selected external device (e.g., the sector of a disk for the data transfer), while word 9 identifies the device, or unit, itself.

Word 10 is shared by the host (on a command) and the I/O controller (on a return), the command identifying how much data is to be transferred (transfer count) between the selected device and the host main memory. When the transfer has been completed the I/O controller then specifies the amount of data (transfer count) that has actually been transfered.

Word 11 is also effectively shared by host and controller. On a command the host supplies all zeroes which indicates to the controller that the host is ready for the controller to execute the command involved. On a return the controller supplies information concerning the completed execution of the command as follows:

| Bit | Meaning if set: |
| --- | --- |
| 0 | Any CB hard execution error |
| 1 | Interpretation error |
| 2 | Soft errors in execution occurred; controller recovered |
| 3 | CB termination by Cancel List command |
| 4 | ECC correction needed |
| 5 | ECC correction failed |
| 6–14 | Unused |
| 15 | CB Done bit |

Although words 12 and 13 in the embodiment under discussion are reserved for future use, words 14–20 include information supplied by the I/O controller concerning the status of various error situations which may have arisen during the execution of the command (word 14), the status of the selected external device in this connection (word 15), the total number of error retries performed (word 16), the total amount of data (e.g., data sectors on a disk) which was transferred before an error occurred (word 17), the address of the selected device where the error occurred, e.g., a physical cylinder address on a disk (word 18) and the physical head address and physical sector address on a disk (word 19). Word 20 identifies a code which represents an error which has occurred with reference to the drive circuitry for the selected device (e.g., disk drive circuitry), e.g., a bus fault, a specified circuit checkpoint error, an error in the drive logic, an error in the position circuitry, a power failure, or an error in the Read/Write circuitry.

Accordingly, each control block, which is accessed by the I/O controller upon command from the host processor, provides sufficient information for the controller micro-processor to execute the command involved and to return to the host in the control block further information concerning such execution, i.e., as to whether it has been completed or whether a fault occurred to prevent the transfer of some or all of the data.

Before transferring one or more control blocks from the host main memory to the I/O controller so that the commands involved can be executed by the controller micro-processor, certain initialization information is provided to the host by the controller to inform the host about the status of both the controller and units which are available for data transfer via the controller. Such information transfer utilizes predefined information blocks which are stored in the controller's local memory and are peculiar to the particular I/O controller involved. Once the host processor is so informed about the particular I/O controller with which it is communicating, the host can modify the controller's operation to some extent by modifying the information in the information blocks supplied to it by the controller so that the host (i.e., the user) has some flexibility in how he wishes to handle the data transfer operation. In the particular embodiment being described the system utilizes three such information blocks as described below. Such information blocks are transferred to the host main memory, modified if desired by the host and returned to the I/O controller local memory.

One information block can be designated as a controller information block, shown in FIG. 4 as comprising two 16-bit words. This block is programmable and contains device specific information concerning the controller, in this case the manner in which the controller is to handle the retrying of errors (in cases where an error has occurred and the controller repeats the command execution a selected number of time to see if the error is one which is intermittent and will, when not present, permit a successful completion of the command, i.e., a "soft" error). Word 0 defines the maximum number of times the controller will attempt to execute a control block for a device, or unit, which is reporting an error. In all cases the words are all zeroes at power up and the controller microcode is arranged to set the information in the information blocks following power up.) Word 1 defines the maximum number of times the controller will attempt to execute a control block for an error which arises in the controller itself (bits 0–7) and the maximum number of correction retries the controller will attempt to read data with an error in the error correction code (ECC) (bits 8–15). For example, in the latter cases the controller processor can be arranged so that a read retry is not attempted unless the controller retry count is exceeded and the controller senses an ECC error. If during execution of a control block the maximum number of retries in this information block is exceeded in any case the type of error is indicated in the appropriate return control block words and also indicates therein the number of retries attempted, as discussed above.

A second information block can be designated as an interface information block and contains universal information concerning a specified device which the host processor needs to know in order to handle a data transfer with respect to such device. The type of information in this block is the same for any device with which the controller is in communication and such information cannot be modified by the host processor. The interface information block is shown in FIG. 5 as comprising, in a particular embodiment under discussion, seven 16-bit words.

Word 0 contains the device type code and identifies which type of device is being communicated with, while word 1 contains the microcode revision number which identifies the particular instruction set which is currently executed by the I/O controller.

Word 2 defines the highest unit number to indicate how many units are being handled by the controller and is fixed for any particular controller. Word 3 defines the total number of control blocks which can be stored in the local memory of the controller (in a particular embodiment, for example, a controller may be capable of storing up to 30 control blocks) and is fixed for a particular controller. Word 3 also includes a legal count code which defines the type of data units which are being transferred with respect to the particular type of external device being used, e.g., data sectors for a disk device, data bytes for a tape device, etc. In a particular embodiment, for example, the legal count code may identify sectors, bytes, words or pages.

Word 4 can be used as a masking word so as to cause an interrupt if any bits in the control block unit status word (word 15 of the control block) change. Word 5 defines the number of control block return status words (i.e., words 10–20 of a control block) are to be returned to the host in a returned control block, the host processor being capable of modifying this number as desired. For example, if the host specifies "0" the controller will not return any information in words 10–20 of a control block after it completes a control block. If the host specifies any number of words from 1 to 11 and no error occurs, the controller will supply information in return control block words 10 and 11 only. If an error occurs the controller will return information only for the return control block words requested by the host.

Words 6 and 7 include masking information and contain bit 0 (word 6) which indicates, when set, that page number list addresses of a control block are two words long and, when not set, that page number list addresses are one word long. The remaining lists of words 6 and 7 form a 31-bit mask word which is logically ANDed with the page number list entry to produce a physical page number.

A further information block designated as a unit information block comprising six 16-bit words is shown in FIG. 6. A unit information block is available for each unit with which the controller is in communication and includes all the information, both universal and device-specific, which is needed by the host processor for handling data transfers with respect to such unit. Accordingly, the host processor cannot modify any of the information in the unit information block, except for information in bits 0–3 of word 0 thereof, is discussed below.

Before discussing the latter bits, it can be seen that word 0 (bits 9–15) is used to identify the external unit involved (as in word 9 of the control block). Word 1 defines the device configuration. Thus, when the unit is a disk, for example, the disk configuration is defined as follows:

| Bit | Meaning if set: |
| --- | --- |
| 0 | Moving Heads |
| 1 | Fixed Heads |
| 2 | Fixed/Removable Media |
| 3 | Dual Ported |
| 4–15 | Unspecified |

Words 2 and 3 define the number of logical blocks, i.e., for a disk, the number of disk sectors, which can be accessed on the device. Word 4 defines the number of data bytes per logical block of the device (e.g., the number of data bytes per sector). For a disk, word 5 defines the number of cylinders per disk, while word 6 defines both the number of heads per disk and the number of sectors per disk track. None of the values (other than bits 0–3 of word 0) can be changed.

Bit 0 of word 0 controls the type of execution which is to be used when the controller has stored control blocks from more than one control block list. In order to understand such operation the manner in which the controller handles control blocks should be understood. The I/O controller stores in its local memory only one control block from each of a plurality of control block lists (presuming the host processor has enqueued more than one such list). The controller can only execute one of such control blocks at a time, either by completing the control block of a given list which it is currently executing and then executing either the next successive control block in the same list or a currently stored control block from another list (either the next successive list or any other list that may have a control block stored in local memory).

With that in mind, the I/O controller may be arranged, for example, to operate in a selected manner, which might be designated as a normal or non-optimized manner, as follows. When the controller completes a control block of a particular list for a given external unit, if the next control block of that same list specifies the same unit, the controller executes such next control block. Otherwise, the controller executes a control lock of the next successive list in the queue of lists which require execution for the same unit. Further the controller may be arranged so that it enqueues a control block list behind all other lists for a specified unit (1) if a Start List command from he processor (processor commands are discussed in more detail below) requires the controller to start a new list, or (2) if a new unit is specified in the next control block of a currently executing list. Such "normal" operation in effect preserves the execution order of control blocks in a list and preserves the order of the lists when more than one unit is not contained in a single list. Such operation occurs so long as the optimization bit 0 (the "0" bit) of word 0 is not set, i.e., so long as the host processor does not request optimization by setting the 0 bit.

If the "0" bit is set, optimization is enabled and the controller can execute current control blocks from any list in any desired order in accordance with any suitably selected algorithm for producing the most efficient transfer of information (e.g., movement of the Read-/Write heads) with respect to a given device (e.g., on a given disk). Thus, if five control block lists each contain control blocks for the same unit the controller does not have to complete one list before starting the next. Instead, it may skip from list to list and execute control blocks for the same unit from different control block lists in accordance with a suitably selected and predefined algorithm. In any event, the order of control blocks within a list is preserved.

Bit S (bit 1 of word 0) represents an error interrupt bit. If set by the host, the controller must interrupt the host on any error which occurs during the execution of a control block. If not set, an interrupt occurs only when all the retry counts in the controller information block have been exhausted and the error is then "hard".

Bit M (bit 2 of word 0) represents a modified bit which, when set by the host, informs the controller that the host has modified the information of a sector of the disk on a write operation. If not set a write operation clears the modified bit.

The A bit (bit 3 of word 0) is used when an external unit has dual ports permitting two controllers to access the same unit. For such units three operations can occur: (1) a "reserve" operation in which a device is reserved for exclusive use by one controller via one port (another controller cannot even use the other port); (2) a "release" operation which frees a device from exclusive use by a controller so that a second controller can use the unit through the other port (the unit is automatically released by a controller after each use); and (3) a "trespass" operation which overrides a controller's exclusive use of a unit at any time, e.g., a second controller can override, via a second port, a first controller which has currently reserved use of the unit via the first port. Such operations are controlled through use of the A bit in conjunction with the 0 bit as follows.

When the A bit is not set (the 0 bit is a "don't care") a controller reserves a unit before executing a control block and keeps the unit reserved so long as current control blocks specify such unit. When the current control blocks no longer specify that unit the controller releases the reserved unit.

When the A bit is set and the 0 bit is not set, a controller reserves a unit before executing a control block but immediately releases it after execution. If this condition is set for two controllers using the same unit, for example, the controllers in effect alternate their use of the unit.

When the A bit is set and the 0 bit is also set, a controller reserves a unit before executing a control block and after execution checks the control block optimization queue for that drive. If further control blocks are awaiting execution for such unit the controller executes the next control block in the queue and does not release the unit until all such control blocks in the queue are executed.

The "trespass" condition only occurs for a programmed I/O command therefor issued by the host processor as discussed with reference to programmed I/O commands below. Such a command is normally rarely used but can be issued, for example, if a user requires immediate access to a unit.

In addition to control blocks and initiation information blocks discussed above, an extended status information block can be stored by the controller in its local memory. If an error occurs the error can usually be resolved using the error status information provided in the status registers (discussed below) or in the control block error status words. However, if the error is severe (effectively not resolvable using such information) it may be necessary to supply additional (extended) information to the host concerning the error status, such information being supplied by generating an extended status information block of thirty-two 16-bit words, as shown in FIG. 7. The words generally contain information as follows:

| Words | Block Name | Contents |
| --- | --- | --- |
| 0-1 | Ending Memory Address | Control information and the high speed channel |
| 2-18 | Controller Error Report | A dump of the controller's registers. This dump contains disk information generated before and after an error. |
| 19-23 | — | Unused; all zeros. |
| 24-29 | Drive Error Report | An error code and drive status information. |
| 30-31 | — | Unused; all zeros. |

An extended status information block is maintained for each unit accessed by the controller and provides status information for each error which occurs (when the S bit of the unit information block is set the status information at the time such error occurred is contained in the extended status block while if the S bit is not set the extended status block reflects the last error that occurred). The host can retrieve the extended status block for a particular unit from the controller's local memory by issuing the appropriate command therefor as discussed below. After storing an extended status block in main memory the host must issue a re-start command to begin execution again, also as discussed below.

The commands utilized by the host processor and supplied from the host accumulators to the command registers 14 comprise a programmed I/O (PIO) command set for controlling the operation of the controller and the transfer of control blocks and information blocks. Such commands are issued by the host in response to appropriate assembler I/O instructions utilized by the host in accordance with the operation of the host processor. for example, the host processor may be a processor of the type made and sold by Data General Corporation under the designation Eclipse ®, one such model thereof being the MV-8000 ® model which is currently available to those in the art and which includes suitable I/O instructions. Other processors available to the art can be used by those in the art and their use in the context described would be within the skills of those in the art from the description presented here. In this context, control blocks, as described above, form a command set for the external device drive interface, e.g., a set of disk commands. The control blocks are loaded with a device command operation code and the control block is executed by issuing a PIO command from the host processor via an assembler I/O instruction which decodes the assembler instruction to produce the required PIO command.

The controller responds to the PIO commands via the controller registers, i.e., the command registers 14 (DOA, DOB and DOC), and the return status registers 15 (DIA, DIB and DIC), each containing a 16-bit word in the particular embodiment disclosed. The assembler instructions transfer information between host accumulators and the controller registers 14 and 15, i.e., PIO commands from the host to registers 14 and status and interrupt information from registers 15 to host.

FIG. 8 depicts the format of PIO commands issued to command registers DOA, DOB and DOC. As can be seen, the registers 14A and 14B contain the command arguments while register 15C contains the PIO command code and a return bit (the unused bits are all 0's). If the arguments are addresses (as is usually the case, for example, when the command requires the I/O controller to fetch a control block at a specified location in main memory) register A contains the high order word (most significant bits) and register B the low order word (least significant bits). A selected bit (e.g., bit 0) of register 14A can be used to indicate whether the address is a physical address (bit 0=0) or a logical address (bit 0=1). The return bit R determines whether the controller will generate a synchronous interrupt when the PIO command has been completed (R is set) or whether such interrupt is not generated (R is not set). The command registers can be loaded in any order so long as the controllers' "busy" flag (on line 26) is clear (not set). The execution of the PIO command will not begin until the host issues a start S-pulse on line 24.

The I/O controller loads interrupt return information into status registers 15. Interrupts in the system described can be asynchronous or synchronous in nature, the former occurring after a control block error or when the controller completes its execution of a control block and the latter occurring when the controller completes a PIO command.

FIG. 9 depicts the return information format in registers 15 wherein registers 15A and 15B contain interrupt information and register 15C contains status information ("status") concerning the command state, further command completion status bits ("CCS") indicating the type of interrupt and either the original command code and return request bit (as originally loaded into bits 6-15 of register 14C) if a synchronous interrupt occurs or interrupt code if an asynchronous interrupt occurred. The status bits 0-3 are valid only when the "Busy" flag is clear, while the remaining bits of all the registers are valid only when the "Done" flag is set.

The Busy and Done flags indicate whether the I/O controller is performing an operation or whether it has completed one and their settings can be checked before issuing a PIO command. The Busy flag is set as soon as the host issues an S-pulse and remains set until execution of the entire PIO command is completed so that no further PIO commands can be issued to registers 14 until the Busy flag is clear. The Done flag, whether set for an asynchronous or a synchronous interrupt, indicates that the status registers 15 contain valid return information. Selected bits of the I/O assembler instruction are used to control selected functions of the I/O controller via the pulse signals on dedicated lines 22–25. The R-pulse resets all internal I/O controller logic, clears the Busy and Done flags and all pending interrupt requests. The S-pulse starts a PIO command, thereby setting the Busy flag and clearing the Done flag. The C-pulse services an interrupt and clears the Done flag and the pending interrupt. The P pulse sets an internal controller state that causes an Interrupt (Line 28) to be generated when the controller goes Not Busy if the Done flag is clear.

Appendix A shows a table of exemplary PIO commands which can be issued by the host processor and supplied to registers 14 the contents of each such register being listed therein for each such command The specific encodings of the registers, and particularly the DOC register 15C, are exemplary only for use in a particular embodiment of the invention and illustrate typical encodings.

For example, command operating codes in the register 15C can be as follows:

| Octal Code | Command Name |
|---|---|
| 000 | Program Load |
| 002 | Begin |
| 024 | Diagnostic Mode (Enter/Exit) |
| 026 | Set Mapping Information |
| 027 | Get Mapping Information |
| 030 | Set Interface Information |
| 031 | Get Interface Information |
| 032 | Set Controller Information |
| 033 | Get Controller Information |
| 034 | Set Unit Information |
| 035 | Get Unit Information |
| 040 | Get Extended Status 0 |
| 041 | Get Extended Status 1 |
| 042 | Get Extended Status 2 |
| 043 | Get Extended Status 3 |
| 100 | Start List |
| 103 | Start List (High Priority) |
| 116 | Restart |
| 123 | Cancel List |
| 131 | Unit Status |
| 132 | Trespass |
| 133 | Get List Status |
| 777 | Reset |

When the particular PIO command is completely executed the I/O controller loads its status registers 15 with the command return information and sets the Done flag when the Busy flag clears if the return request bit R is set. If the latter is not set the status registers are not loaded nor is the Done flag set. Setting the Done flag generates an interrupt request to the host.

If the PIO command results in an error, the controller loads error return information into the status registers 15 and sets the Done flag regardless of whether the return request bit is set. The registers 15 transfer their contents to specified host accumulators so that the host can determine interrupt recovery procedures. The host interrupt routine services such interrupt by issuing a C-pulse.

Selected bits (bits 4-5) of the status register 15C indicate whether the interrupt is asynchronous or synchronous while other selected bits (bits 6-15) are coded to indicate the kind of error which occurred. If a synchronous interrupt occurs such bits merely "echo" the original command code and return request bit setting of the most recent command sent to the controller. The status bits 0-3 of register 15C are valid whenever Busy is clear, while the remaining bits thereof are valid whenever the Done flag is set. Additional return information can be transferred via registers 15A and 15B. Whenever such information represents an address, register 15A contains the higher order bits and register 15B the lower order bits. Such register contents are valid when the Done flag is set.

The table of Appendix B lists different types of exemplary asynchronous interrupts while the table of Appendix C lists different types of exemplary synchronous interrupts and both tables describe the contents of registers 15 in each case for a particular embodiment of the invention.

The controller completion status determined by bits 4-5 of register 15C identifies the following exemplary types of interruptions.

```
+--+--+--+--+--+--+--+--+--+--+--+--+--+--+--+
  Status    CCS      Command Echo or Interrupt Code
+--+--+--+--+--+--+--+--+--+--+--+--+--+--+--+
  0  1  2  3  4  5  6  7  8  9  10 11 12 13 14
```

| Bits | Name | Contents or Function |
|------|------|----------------------|
| 0-3  | Status | The controller execution state (see Chapter 4). |
| 4-5  | CCS | The controller completion status: |

| Bit Setting | Meaning |
|-------------|---------|
| 00 | Asynchronous interrupt occurred |
| 01 | PIO illegal command error: invalid command code |
| 10 | PIO command execution error: unsuccessful command execution |
| 11 | PIO command completed: successful command execution |

Exemplary types of asynchronous interrupt error codes as used in bits 6-15 of status register 15C are identified as follows:

| Octal Code | Interrupt Name |
|------------|----------------|
| 1 | Null Interrupt |
| 2 | Controller Interrupt |
| 3 | CB Execution Error: Soft Errors |
| 4 | CB Execution Error: Hard Errors |
| 5 | No Errors |
| 6 | CB Termination Error: Cancel List |
| 7 | Soft Errors: S Bit Set |
| 10 | CB Interpretation Error: Status Word not O |
| 11 | CB Interpretation Error: Illegal CB Command |
| 12 | CB Interpretation Error: CB Range Error |
| 13 | CB Interpretation Error: Illegal Unit Number |
| 14 | CB Interpretation Error: Illegal Link Address |
| 15 | CB Interpretation Error: Illegal Page Number List Address |
| 16 | CB Interpretation Error: Illegal Transter Address |
| 17 | CB Interpretation Error: Illegal Transter Count |
| 20 | Unreadable CB |
| 21 | Unwritable CB |
| 77 | Power Fail |

Upon the occurrence of an error identified by the error code the controller utilizes an appropriately predetermined interrupt routine with respect thereto.

Although a host processor can be used to provide any appropriate type of command to the controller, depending on how the system is to be used, in one embodiment, for example, such commands can generally fall into the following categories. Initialization commands can be used to transfer different use options available to the system during operation, such as address mapping, interface, controller and device (unit) operations. Diagnostic commands are used to perform selected diagnostic tests on the controller in the event of controller errors. Extended status commands are used to examine the state of the device subsystem when an error occurs. List control commands are used to perform control block operations. State independent commands can be used to initiate the diagnostic command set or to reset the controller. Valid While Reset commands can be used to move initial Load Programs into the host main memory or to cause the controller to load its microcode control store.

Appropriate encoding thereof and the design of suitable software for performing such operations will depend on the type of processors and micro-processors used and will be well within the skill of the art. For example, the host may be a Data General Corporation MV-8000 ® system while the controller micro processor may be of the type made and sold by Data General Corporation under the the designations Micro-NOVA ® or Micro Eclipse ® microprocessors. The high speed data transfer channel may be of the type described in U.S. Pat. No. 4,403,282, issued Sept. 6, 1982, a high speed data transfer channel often referred to as a "burst multiplex channel" as used, for example, and available in Data General Corporation's M-600 data processing system.

APPENDIX "A"
Programmed I/O Commands
To The Controller

| COMMAND | DOA REGISTER | DOB REGISTER | DOC REGISTER |
|---------|--------------|--------------|--------------|
| Begin Cancel List (123) | Unit Number High-order address word of CB list to cancel | Unused Low-Order address word of CB list to cancel | 0000000000000 0000000010100 |
| Diagnostic Mode (024) | Enter: 125252 (base 8) Exit: 0 | Enter: 125252 (base 8) Exit: 0 | 0000000000101 |
| Get Controller Information (033) | High-order address word of the controller information block | Low-order address word of the controller information block | 0000000000110 |
| Get Extended Status 0 (040) | High-order address word of the extended status information block for drive 0 | Low-order address word of the extended status information block for drive 0 | 0000000001000 |
| Get Extended Status 1 (041) | High-order address word of the extended | Low-order address word of the extended | 0000000001000 |

-continued

| COMMAND | DOA REGISTER | DOB REGISTER | DOC REGISTER |
|---|---|---|---|
| Get Extended Status 2 (042) | status information block for first I/O driver High-order address word of the extended status information block for second I/O driver | status information block for first I/O driver Low-order address word of the extended status information block for second I/O driver | 0000000001000 |
| Get Extended Status 3 (043) | High-order address word of the extended status information block for third I/O driver | Low-order address word of the extended status information block for third I/O driver | 0000000001000 |

APPENDIX A-2

| COMMAND | DOA REGISTER | DOB REGISTER | DOC REGISTER |
|---|---|---|---|
| Get Interface Information (031) | High-order address word of the interface information block | Low-order address word of the interface information block | 0000000000110 |
| Get List Status (133) | High-order address word of the first CB in a list | Low-order address word of the first CB in a list | 0000000010110 |
| Get Mapping Information (027) | Unused | Unused | 0000000000101 |
| Get Unit Information (035) | High-order address word of the unit information block | Low-order address word of the unit information block | 0000000000111 |
| Program Load (000) | Unit number | Unused | 0000000000000 |
| Reset (777) | Unused | Unused | 0000001111111 |
| Set Controller Information (032) | High-order address word of the controller information block | Low-order address word of the controller information block | 0000000000110 |
| Set Interface Information (030) | High-order address word of the interface information block | Low-order address word of the interface information block | 0000000000110 |
| Set Mapping Information (026) | Mapping options | Mapping options | 0000000000101 |
| Set Unit Information (034) | High-order address word of the unit information block | Low-order address word of the unit information block | 0000000000111 |
| Start List (100) | High-order address word of the CB list to execute | Low-order address word of the CB list to execute | 0000000010000 |

APPENDIX A-3

| COMMAND | DOA REGISTER | DOB REGISTER | DOC REGISTER |
|---|---|---|---|
| Start List (high Priority) (103) | High-order address word of the CB list to execute | Low-order address word of the CB list to execute | 0000000010000 |
| Trespass (132) | Unit number | Unused | 0000000010110 |
| Unit Status (131) | Unit number | Unused | 0000000010110 |

APPENDIX "B"

-continued

Interrupt Information-Asynchronous

| DIC OCTAL CODE (Bits 6–15) | INTERRUPT IDENTIFICATION | CONTROL BLOCK LIST STATUS | DIA AND DIB REGISTER CONTENTS |
|---|---|---|---|
| 0 | Null Interrupt | — | Unused |
| 1 | Controller Error | — | Program Counter and Stack pointer |
| 2 | CB Execution Error: Soft Errors | List complete | Double word address of the first CB in the list |
| 3 | CB Execution Error: Hard Errors | List terminated | Double word address of first CB in the list |
| 4 | I Bit Set | CB complete | Double word address of the interrupting CB |
| 5 | No Errors | List complete | Double word address of the first CB in the list |
| 6 | CB Termination Error: Cancel List | List terminated | Double word address of the first CB in the list |
| 7 | Soft Error: S Bit Set | CB not complete | Double word address of the first CB in the list |
| 10 | CB Interpretation Error: Status Word Not 0 | List terminated; status word not written | Double word address of the first CB in the list |
| 11 | CB Interpretation Error: Illegal CB Command | List terminated | Double word address of the first CB in the list |

APPENDIX B-2

| DIC OCTAL CODE (Bits 6–15) | INTERRUPT IDENTIFICATION | CONTROL BLOCK LIST STATUS | DIA AND DIB REGISTER CONTENTS |
|---|---|---|---|
| 12 | CB Interpretation Error: CB Range Error | List terminated | Double word address of the first CB in the list |
| 13 | CB Interpretation Error: Illegal Unit Number | List terminated | Double word address of the first CB in the list |
| 14 | CB Interpretation Error: Illegal Link Address | List terminated | Double word address of the first CB in the list |
| 15 | CB Interpretation Error: Illegal Page Number List Address | List terminated | Double word address of the first CB in the list |
| 16 | CB Interpretation Error: Illegal Transfer Address | List terminated | Double word address of the first CB in the list |
| 17 | CB Interpretation Error: Illegal transfer Count | List terminated | Double word address of the first CB in the list |
| 20 | Unreadable CB | List terminated; status word not written | Double word address of the first CB in the list |
| 21 | Unwritable CB | List terminated; status word may or may not have been written | Double word address of the first CB in the list |

APPENDIX "C"
Interrupt Information-Synchronous

| HOST COMMAND | DIA STATUS REGISTER | DIB STATUS REGISTER | DIC STATUS REGISTER |
|---|---|---|---|
| Begin (002) | Unused unless programmed I/O (PIO) command execution error occurs | Unused unless a PIO command execution error ocurs | 000000010R |
| Cancel List (123) | High-order word address of first CB in the terminated list | Low-order word address of first CB in the terminated list | 001010011R |
| Diagnostic Mode (024) (Enter/Exit) | Unused | Unused | 000010100R |
| Get Controller Information (033) | Unused | Unused unless a PIO command execution error occurs | 000011011R |
| Get Extended Status 0 (040) | Unused | Unused unless a PIO command execution error occurs | 000100000R |
| Get Extended Status 1 (041) | Unused | Unused unless a PIO command execution error occurs | 000100001R |
| Get Extended Status 2 (042) | Unused | Unused unless a PIO command execution error occurs | 000100010R |
| Get Extended Status 3 (043) | Unused | Unused unless a PIO command execution error occurs | 000100011R |
| Get Interface Information (031) | Unused | Unused unless a PIO command execution error occurs | 000011001R |
| Get List Status (133) | List status | Number of current CB | 001011011R |

APPENDIX C-2

| HOST COMMAND | DIA STATUS REGISTER | DIB STATUS REGISTER | DIC STATUS REGISTER |
|---|---|---|---|
| Get Mapping Information (027) | Mapping options | Mapping options | 000010111R |
| Get Unit Information (035) | Unused | Unused unless a PIO command execution error occurs | 000011101R |
| Program Load (000) | Unused unless a PIO command execution error occurs | Unused unless a PIO command execution error occurs | 000000000R |
| Reset (777) | Unused | Internal diagnostic results (zero if no errors) | 111111111R |
| Restart (116) | Unit number | Unused | 001001110R |
| Set Controller Information (032) | Unused | Unused unless a PIO command execution error occurs | 000011010R |
| Set Interface Information (030) | Unused | Unused unless a PIO command execution error occurs | 000011000R |
| Set Mapping Information (026) | Mapping options | Mapping options | 000010110R |
| Set Unit Information (034) | Unused | Unused unless a PIO command execution error occurs | 000011100R |
| Start List (100) | High-order address word of first CB in started list | Low-order address word of first CB in started list | 001000000R |
| Start List (High Priority) (103) | High-order address word of first CB in started list | Low-order address word of first CB in started list | 001000011R |

APPENDIX C-3

| HOST COMMAND | DIA STATUS REGISTER | DIB STATUS REGISTER | DIC STATUS REGISTER |
|---|---|---|---|
| Trespass (132) | Unit Number | Unused | 001011010R |
| Unit Status (131) | Unused | Unit Status word | 001011001R |

What is claimed is:

1. A system for controlling input/output operations required by a host computer, which includes host processor means and host memory means, in communication with one or more input/output devices, said system comprising:
   an input/output controller unit connected to said host computer and to said one or more input/output devices for controlling said input/output operation in response to input/output commands from said host processor means, said controller unit including controller processor means and controller memory means;
   said host memory means being accessible to said controller unit for storing a plurality of control block lists, each control block list corresponding to one of said input/output commands and including control blocks of command information;
   means for transferring one or more input/output commands from said host processor means to said controller processor means of said controller unit;
   said controller processor means being responsive to said input/output commands transferred thereto for successively accessing from said host memory means the control block lists corresponding to said input/output commands;
   said controller memory means being connected to said controller processor means for storing said control block lists, each including command information, control information supplied by said host processor means, status return information supplied by said controller processor means, and error information concerning errors which arise during execution of the operation corresponding to said control block of command information;
   said controller processor means includes
   means for selecting one of plurality of different sequences of said control block of command information from said control block lists in accordance with a predetermined algorithm in said controller memory means; and
   means responsive to said selected sequence of control blocks of command information for executing the operations required by said input/output commands.

2. A system in accordance with claim 1 wherein said host computer further includes a host main memory, the memory means storing said one or more control block lists being a part of said host main memory.

3. A system in accordance with claim 2 and further including a high speed data channel for transferring information between said host main memory and said controller unit, said controller processor means accessing said one or more control block lists via said high speed data channel.

4. A system in accordance with claim 1 wherein said transferring means comprises bus means interconnecting said host processor means and said controller unit, said input/output commands being transferred via said bus means.

5. A system in accordance with claim 4 wherein said controller unit includes command storage means for storing the input/output said commands transferred from said host processor means.

* * * * *